(12) United States Patent
Kim et al.

(10) Patent No.: US 9,718,472 B2
(45) Date of Patent: Aug. 1, 2017

(54) AUTOMATIC VEHICLE SPEED CONTROL APPARATUS AND METHOD

(71) Applicant: Hyundai Motor Company, Seoul (KR)

(72) Inventors: Tae Soo Kim, Incheon (KR); Baro Hyun, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/955,650

(22) Filed: Dec. 1, 2015

(65) Prior Publication Data

US 2016/0325745 A1 Nov. 10, 2016

(30) Foreign Application Priority Data

May 7, 2015 (KR) ........................ 10-2015-0063985

(51) Int. Cl.
*B60W 30/16* (2012.01)
*B60K 6/485* (2007.10)
*B60W 10/06* (2006.01)
*B60K 6/48* (2007.10)
*B60W 10/08* (2006.01)
*B60W 20/10* (2016.01)

(52) U.S. Cl.
CPC ............ *B60W 30/16* (2013.01); *B60W 10/06* (2013.01); *B60W 10/08* (2013.01); *B60W 20/10* (2013.01); *B60W 2520/10* (2013.01); *B60W 2550/302* (2013.01); *B60W 2550/308* (2013.01); *B60W 2550/402* (2013.01); *B60W 2710/0666* (2013.01); *B60W 2720/10* (2013.01); *B60W 2720/103* (2013.01)

(58) Field of Classification Search
CPC ......... B60W 30/16; B60W 10/06; B60L 7/18; B60K 6/485; B60K 6/48; B60R 21/0134; B60T 7/22; B60S 1/0896
See application file for complete search history.

(56) References Cited

U.S. PATENT DOCUMENTS

| 8,909,421 B2* | 12/2014 | Zimmer ................ B60S 1/0896 |
| | | 701/36 |
| 2002/0143441 A1* | 10/2002 | Yamaguchi ............ B60K 6/485 |
| | | 701/22 |
| 2005/0137766 A1* | 6/2005 | Miyakoshi ................ B60T 7/22 |
| | | 701/36 |

(Continued)

FOREIGN PATENT DOCUMENTS

| JP | 2011-121417 A | 6/2011 |
| JP | 2014-518802 A | 8/2014 |

(Continued)

*Primary Examiner* — Yuri Kan
(74) *Attorney, Agent, or Firm* — Mintz Levin Cohn Ferris Glovsky and Popeo, P.C.; Peter F. Corless

(57) ABSTRACT

An automatic vehicle speed control apparatus includes a detection unit that detects position information of a subject vehicle and a preceding vehicle positioned ahead of the subject vehicle, an automatic vehicle speed control unit that calculates a target requested torque with respect to the current position of the subject vehicle by using the position information, an automatic vehicle speed modeling unit that generates a target requested torque profile during a preset section from the current position of the subject vehicle, and a control unit that controls driving of the subject vehicle by using the target requested torque and the target requested torque profile.

15 Claims, 3 Drawing Sheets

(56) References Cited

U.S. PATENT DOCUMENTS

| | | | |
|---|---|---|---|
| 2008/0097699 A1* | 4/2008 | Ono | B60R 21/0134 |
| | | | 701/300 |
| 2009/0234524 A1* | 9/2009 | Kim | B60K 6/48 |
| | | | 701/22 |
| 2012/0080249 A1* | 4/2012 | Yates, III | B60L 7/18 |
| | | | 180/65.31 |
| 2014/0088810 A1* | 3/2014 | Gehring | B60W 10/06 |
| | | | 701/22 |
| 2014/0257669 A1* | 9/2014 | Wu | B60W 10/06 |
| | | | 701/102 |

FOREIGN PATENT DOCUMENTS

| | | |
|---|---|---|
| KR | 10-2012-0053899 A | 5/2012 |
| KR | 10-2012-0082602 A | 7/2012 |

* cited by examiner

AUTOMATIC VEHICLE SPEED CONTROL APPARATUS AND METHOD

CROSS-REFERENCE TO RELATED APPLICATION

This application claims under 35 U.S.C. §119(a) the benefit of Korean Patent Application No. 10-2015-0063985 filed in the Korean Intellectual Property Office on May 7, 2015, the entire contents of which are incorporated herein by reference.

BACKGROUND (a) Field of the Invention

The present invention relates to an automatic vehicle speed control apparatus and method.

(b) Description of the Related Art

Recently, in line with growing demand for driver convenience during driving, research into a driver assisting system has been conducted. A smart cruise control (SCC) system is a system enabling a vehicle to be automatically driven at a preset speed without a driver's operation. That is, without a preceding vehicle ahead of the subject vehicle, the subject vehicle is automatically controlled at a speed previously set by a driver, and with a preceding vehicle ahead, a distance to the preceding vehicle is uniformly maintained through distance controlling.

For example, when a preceding vehicle is present ahead, the SCC system calculates a real-time requested torque command on the basis of a distance between the subject vehicle and the preceding vehicle, and a power source of the subject vehicle is driven according to the real-time requested torque command to satisfy a requested torque.

The above information disclosed in this Background section is only for enhancement of understanding of the background of the invention and therefore it may contain information that does not form the prior art that is already known in this country to a person of ordinary skill in the art.

SUMMARY

The present invention provides an automatic vehicle speed control apparatus and method having advantages of predicting and modeling a target requested torque over time when a distance between a subject vehicle employing a smart cruise control (SCC) system and a preceding vehicle is equal to or greater than a predetermined distance, and optimizing fuel efficiency and an operational state of the subject vehicle by using the modeled target requested torque.

An exemplary embodiment of the present invention provides an automatic vehicle speed control apparatus including: a detection unit configured to detect position information of a subject vehicle and a preceding vehicle positioned ahead of the subject vehicle; an automatic vehicle speed control unit configured to calculate a target requested torque with respect to the current position of the subject vehicle by using the position information; an automatic vehicle speed modeling unit configured to generate a target requested torque profile during a preset section from the current position of the subject vehicle; and a control unit configured to control driving of the subject vehicle by using the target requested torque and the target requested torque profile.

The position information may include a distance between the subject vehicle and the preceding vehicle, and vehicle speeds of the subject vehicle and the preceding vehicle. The automatic vehicle speed control unit may include: a speed control unit configured to generate an accelerating torque command of the subject vehicle by using the position information; a target vehicle speed calculating unit configured to calculate a target vehicle speed according to the accelerating torque command; and a target requested torque calculating unit configured to calculate the target requested torque according to a difference between the current vehicle speed of the subject vehicle and the target vehicle speed.

The automatic vehicle speed modeling unit may include: a speed control modeling unit configured to output an estimated accelerating torque command of the subject vehicle at every unit time during the preset section by using the position information; a target vehicle speed estimating unit configured to calculate a target estimate vehicle speed at every unit time according to the estimate accelerating torque command to generate a target vehicle speed profile; and a target requested torque estimating unit configured to calculate a target estimate requested torque according to a difference between the target estimate vehicle speeds respectively corresponding to the unit times to generate the target requested torque profile.

The speed control modeling unit may be activated when the distance between the subject vehicle and the preceding vehicle is greater than a preset reference distance.

The automatic vehicle speed control apparatus may further include: a parameter measurement unit configured to transmit the vehicle information of the subject vehicle and gradient information of a road on which the subject vehicle drives to the target requested torque calculating unit and the target requested torque estimating unit.

The target requested torque estimating unit receives the gradient information from the parameter measurement unit and corrects the target requested torque profile at every unit time. When the target requested torque is greater than 0, the control unit schedules driving of the subject vehicle by using the target requested torque profile during the preset section.

Another exemplary embodiment of the present invention provides an automatic vehicle speed control method including: detecting position information between a subject vehicle and a preceding vehicle positioned ahead of the subject vehicle; generating a target requested torque with respect to the current position of the subject vehicle by using the position information; determining whether the distance between the subject vehicle and the preceding vehicle is greater than a preset reference distance according to the position information; when the distance between the subject vehicle and the preceding vehicle is greater than the reference distance, generating a target requested torque profile during a preset reference section from the current position of the subject vehicle; determining whether the target requested torque is greater than a preset lower limit value; and when the target requested torque is greater than the preset lower limit value, scheduling driving of the subject vehicle during a preference section by using the target requested torque profile.

The position information may include a distance between the subject vehicle and the preceding vehicle and vehicle speeds of the subject vehicle and the preceding vehicle. The generating of the target requested torque may include: generating an accelerating torque command of the subject vehicle by using the position information; calculating a target vehicle speed according to the accelerating torque command; and calculating the target requested torque according to the vehicle information of the subject vehicle, gradient information of a road on which the subject vehicle drives, and a difference between the current vehicle speed of the subject vehicle and the target vehicle speed.

The generating of the target requested torque profile may include: receiving the position information and calculating an estimate accelerating torque of the subject vehicle at every unit time during a preset section; calculating a target estimate vehicle speed at every unit time according to the estimate accelerating torque; and calculating the target estimate requested torque according to the vehicle information of the subject vehicle, the gradient information of the road, and a difference between the target estimated vehicle speeds corresponding to each of the unit time.

The calculating of the target estimate requested torque may include: correcting the target estimate torque according to the gradient information at every unit time. The lower limit value may be 0.

A non-transitory computer readable medium containing program instructions executed by a processor can include: program instructions that detect position information between a subject vehicle and a preceding vehicle positioned ahead of the subject vehicle; program instructions that generate a target requested torque with respect to a current position of the subject vehicle by using the position information; program instructions that determine whether a distance between the subject vehicle and the preceding vehicle is greater than a preset reference distance according to the position information; program instructions that generate a target requested torque profile during a preset reference section from the current position of the subject vehicle, when the distance between the subject vehicle and the preceding vehicle is greater than the reference distance; program instructions that determine whether the target requested torque is greater than a preset lower limit value; and program instructions that schedule driving of the subject vehicle during a preference section by using the target requested torque profile, when the target requested torque is greater than the preset lower limit value.

According to the exemplary embodiments of the present invention, when a distance between the subject vehicle employing the SCC system and a preceding vehicle is equal to or greater than a predetermined distance, a target requested torque over time is predicted and modeled, and fuel efficiency and an operational state of the subject vehicle may be optimized by using the modeled target requested torque.

DETAILED DESCRIPTION OF THE EMBODIMENTS

Figure 1:
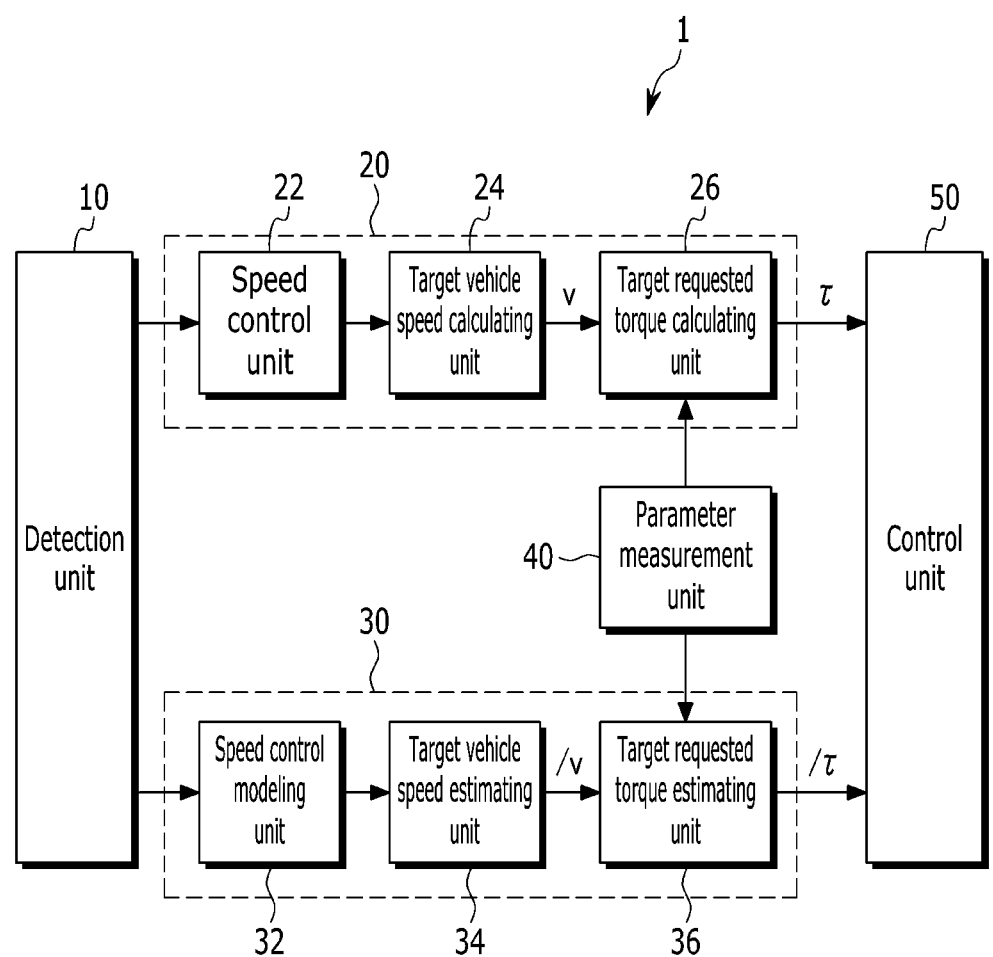
FIG. 1 is a block diagram illustrating an automatic vehicle speed control apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the present invention will be described more fully with reference to the accompanying drawings, in which exemplary embodiments of the invention are shown.

FIG. 1 is a view illustrating an automatic vehicle speed control apparatus according to an exemplary embodiment of the present invention.

Referring to FIG. 1, the automatic vehicle speed control apparatus according to an exemplary embodiment of the present invention includes a detection unit 10, an automatic vehicle speed control unit 20, an automatic vehicle speed modeling unit 30, a parameter measurement unit 40, and a control unit 50.

The detection unit 10 detects position information of a vehicle employing smart cruise control (SCC) system (hereinafter, referred to as a "subject vehicle") and a vehicle positioned ahead of the subject vehicle. For example, the detection unit 10 may detect a distance between the subject vehicle and the preceding vehicle and a relative speed of the subject vehicle according to a speed of the preceding vehicle. The detection unit 10 may include a radar sensor.

The automatic vehicle speed control unit 20 is selectively activated according to operation of a physical button (not shown) for turning on or off the SCC system disposed within the subject vehicle and the position information For example, the automatic vehicle speed control unit 20 may be activated when a physical button within the vehicle is turned on and a distance between the subject vehicle and the preceding vehicle is greater than a reference distance set for the SCC system to be operated or when the current speed of the subject vehicle is faster than a reference speed.

The automatic vehicle speed 20 receives the position information of the subject vehicle and the preceding vehicle, vehicle information of the subject vehicle, and gradient information of a road on which the subject vehicle drives from the detection unit 10 and the parameter measurement unit 40, and calculates a target requested torque with respect to the current position of the subject vehicle.

In detail, the automatic vehicle speed control unit 20 includes a speed control unit 22, a target vehicle speed calculating unit 24, and a target requested torque calculating unit 26. The speed control unit 22 calculates a vehicle speed variation, that is, an accelerating torque command, of the subject vehicle by using the position information.

The target vehicle speed calculating unit 24 calculates a target vehicle speed (v(k+1)) of a next control time point (k+1) with respect to the current position of the subject vehicle according to the accelerating torque command. The target requested torque calculating unit 26 receives the measured vehicle information and the gradient information of the road on which the subject vehicle drives from the parameter measurement unit 40, and calculates a target requested torque to follow the target vehicle speed (v(k+1)) according to the difference between the vehicle speed (v(k)) at the current time point and the target vehicle speed (v(k+1)) of the next control time point (k+1).

When the distance between the subject vehicle and the preceding vehicle is greater than a reference distance previously set for modeling a vehicle speed in a state in which the automatic vehicle speed control unit 20 is activated, the automatic vehicle speed modeling unit 30 is activated and models an operation of the automatic vehicle speed control unit 20.

The automatic vehicle speed modeling unit 30 receives the position information of the subject vehicle and the preceding vehicle, vehicle information of the subject vehicle and the gradient information of the road on which the subject vehicle drives from the detection unit 10 and the parameter measurement unit 40, and generates a target requested torque profile during a preset section starting from the current position of the subject vehicle.

To this end, the automatic vehicle speed modeling unit 30 includes a speed control modeling unit 32, a target vehicle speed estimating unit 34, and a target requested torque estimating unit 36. The speed control modeling unit 32 calculates an estimated accelerating torque command of the subject vehicle at every unit time during a preset reference period of time.

The target vehicle speed estimating unit 34 generates a target vehicle speed profile by calculating a target estimated vehicle speed /vk+1, /vk+2, . . . , /v(k+N) of each of the unit times k+1, k+2, . . . , k+N according to the estimated accelerating torque command.

The target requested torque estimating unit 36 receives the measured vehicle information and the gradient information from the parameter measurement unit 40, and calculates target estimation requested torques /τk+1, /τk+2, . . . , /τ(k+N) according to a difference between the target estimated vehicle speeds (/vk+1, /vk+2, . . . , /v(k+N) corresponding to each of the unit times (k+1, k+2, . . . , k+N) to generate a target requested torque profile.

Here, when a three-dimensional (3D) map based on navigation, or the like, within the vehicle exists and the gradient information is updated at every unit time k+1, k+2, k+N, the target requested torque estimating unit 36 may correct the target estimation requested torques (/τk+1, /τk+2, . . . , /τ(k+N) by using corresponding gradient information. Meanwhile, when the 3D map does not exist, target estimate requested torques (/τk+1, . . . , /τ(k+N)) of the unit times may be calculated based on the gradient information of the current tine pint (k).

The parameter measurement unit 40 measures a weight (m), rolling resistance (Fr), an air resistance value (Cd) of the subject vehicle as vehicle information, and measures a road slope angle (θ(k)) as gradient information. Here, the parameter measurement unit 40 may measure the gradient information using a 3D map, or the like.

The control unit 50 controls driving of the vehicle by combining the target requested torque (τ k+1) and the target estimate requested torques (/τk+1, . . . , /τ(k+N)). The control unit 50 drives an engine and/or a motor according to a target requested torque (τ k+1) at a next time point (k+1) at the current position of the subject vehicle. When the target requested torque (τ k+1) is greater than a preset lower limit value, for example, 0, the control unit 50 schedules power distribution between the engine and the motor, gear shifting, and the like, according to acceleration and deceleration of the target requested torque in advance by using the target estimate requested torques (/τk+2, . . . , /τ(k+N)) during a next section (k+2-k+N).

In case of a hybrid vehicle, the control unit 50 according to an exemplary embodiment of the present invention may be included in a hybrid control unit controlling various systems such as an engine control unit (ECU), a motor control unit (MCU), a transmission control unit (TCU), a battery management system (BMS), and a current conversion controller (or a low voltage DC/DC converter (LDC)) related to driving to maintain optimal performance, or may include a system interworking therewith.

Figure 2:
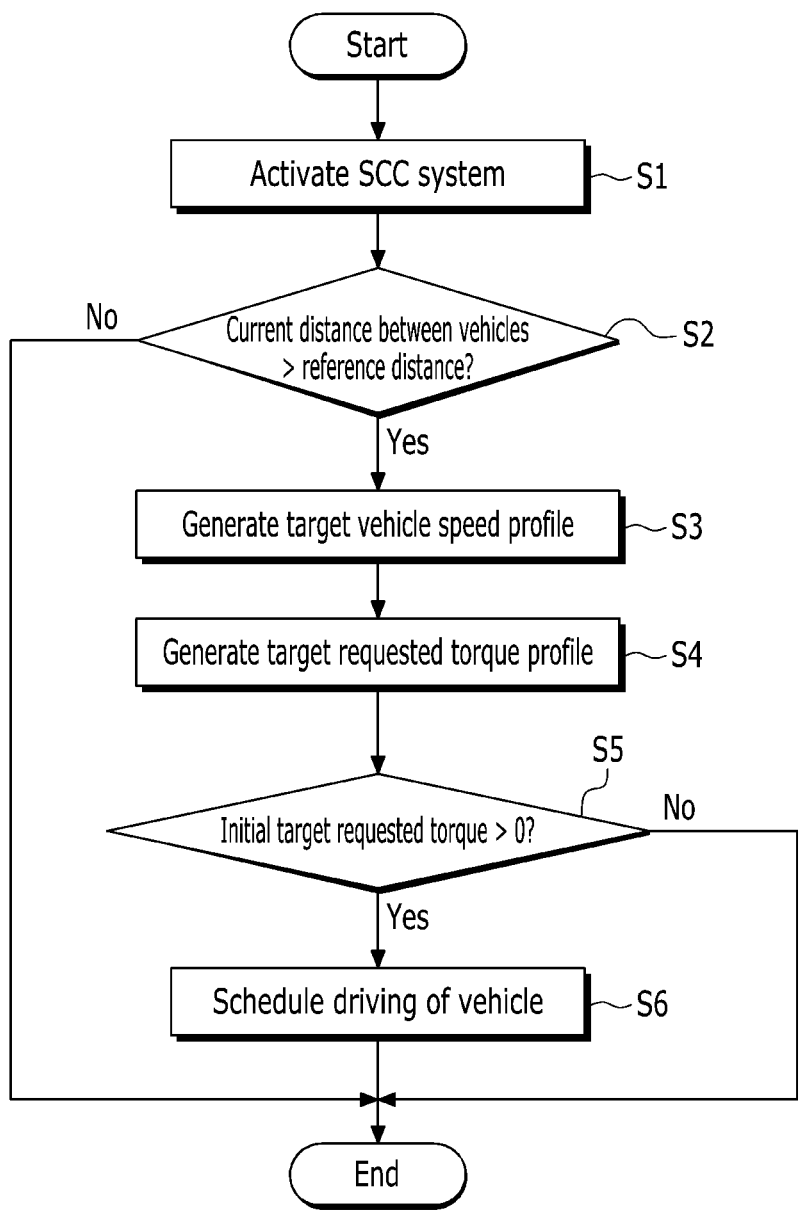
FIG. 2 is a flow chart illustrating an automatic vehicle speed control method according to an exemplary embodiment of the present invention.
Figure 3:
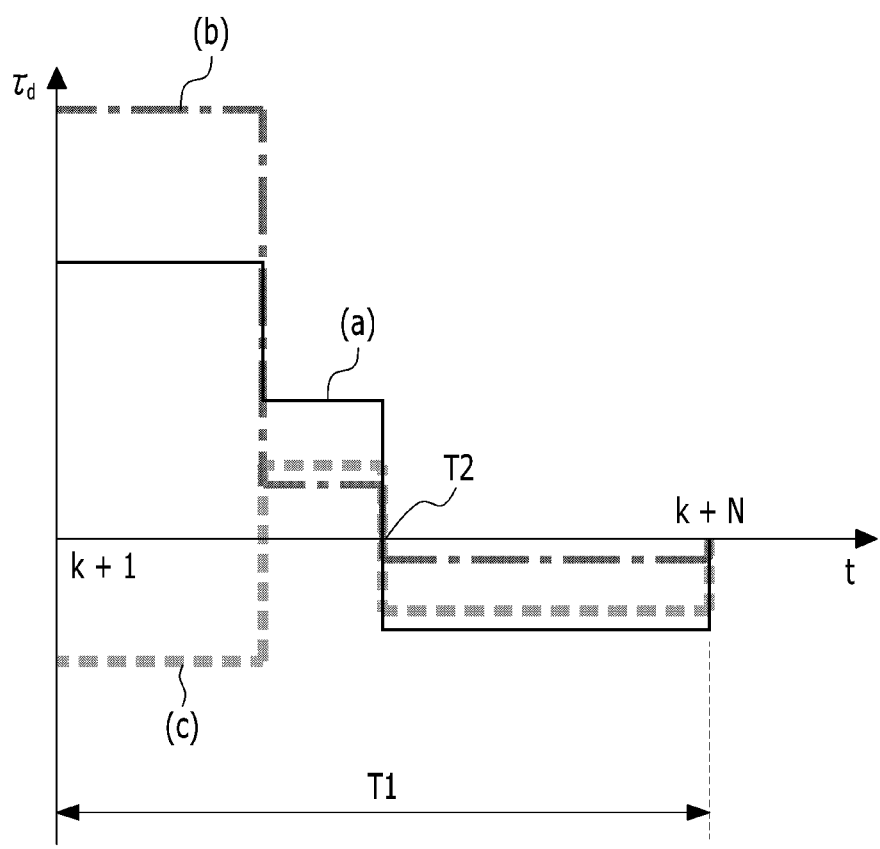
FIG. 3 is a graph illustrating a target requested torque, an engine torque, and a motor torque according to an exemplary embodiment of the present invention.

FIG. 2 is a flow chart illustrating an automatic vehicle speed control method according to an exemplary embodiment of the present invention, and FIG. 3 is a graph illustrating a target requested torque, an engine torque, and a motor torque according to an exemplary embodiment of the present invention.

Referring to FIG. 2, first, a physical button for an SCC system within a subject vehicle is turned on and the automatic vehicle speed control unit 20 is activated (operation S1). Then, the speed control modeling unit 32 determines whether the current distance between the subject vehicle and a preceding vehicle is equal to or greater than a preset reference distance (operation S2).

When the distance between the subject vehicle and the preceding vehicle is greater than the preset reference distance according to the determination result, the speed control modeling unit 32 is activated to calculate an estimate accelerating torque command of each of the unit times (k+1, k+2, . . . , k+N) during a preset reference section. Thereafter, the target vehicle speed estimating unit 34 calculates target estimate vehicle speeds (/vk+1, /vk+2, . . . , /v(k+N)) of the unit times (k+1, k+2, ..., k+N) according to the estimate accelerating torque command to generate a target vehicle speed profile (operation S3).

The target requested torque estimating unit 36 calculates target estimate requested torques (/τk+1, /τk+2, ..., /τ(k+N)) of the unit times (k+1, k+2, ..., k+N) according to the target estimate vehicle speeds (/vk+1, /vk+2, ..., /v(k+N)) to generate a target requested torque profile (operation S4).

Thereafter, the control unit 50 drives the subject vehicle according to the target requested torque (τ k+1), and simultaneously determines whether the initial target requested torque (τ k+1) is greater than 0 (operation S5). When the initial target requested torque (τ k+1) is greater than 0 according to the determination result, the control unit 50 schedules driving of the vehicle during a reference period of time in advance by using the target requested torque profile, and controls the vehicle according to the scheduling (operation S6). Here, the control unit 50 may schedule driving of the vehicle by using the target estimate requested torques (/τk+2, ..., /τ(k+N)) from a time point (k+2).

For example, as illustrated in FIG. 3, the control unit 50 may schedule power distribution between the engine and the motor during a preset reference period of time in advance according to the target estimate requested torque. Here, (a) indicates target estimate requested torque, (b) indicates engine torque, and (c) indicates motor torque.

The control unit 50 may recognize a point in time (T2) at which the target estimate requested torque (a) is changed from acceleration to deceleration, in advance, and thus, a time required for gear shifting may be secured. The control unit 50 may recognize a point in time at which an engine clutch is released and connected, in advance, calculate a battery charge section and a charge amount, and prepare hydraulic controlling of the engine clutch. Also, the control unit may smoothly control actual target requested torque by using the target estimate requested torque (a). Therefore, fuel efficiency and driving convenience of a vehicle may be enhanced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An automatic vehicle speed control apparatus, comprising:
    a detector configured to detect position information of a subject vehicle and a preceding vehicle positioned ahead of the subject vehicle;
    an automatic vehicle speed controller configured to calculate a target requested torque with respect to a current position of the subject vehicle by using the position information;
    an automatic vehicle speed modeler configured to generate a target requested torque profile during a preset section from the current position of the subject vehicle; and
    a controller configured to control driving of the subject vehicle by using the target requested torque and the target requested torque profile.

2. The automatic vehicle speed control apparatus of claim 1, wherein the position information includes a distance between the subject vehicle and the preceding vehicle, and vehicle speeds of the subject vehicle and the preceding vehicle.

3. The automatic vehicle speed control apparatus of claim 1, wherein the automatic vehicle speed controller comprises:
    a speed controller configured to generate an accelerating torque command of the subject vehicle by using the position information;
    a target vehicle speed calculator configured to calculate a target vehicle speed according to the accelerating torque command; and
    a target requested torque calculator configured to calculate the target requested torque according to a difference between a current vehicle speed of the subject vehicle and the target vehicle speed.

4. The automatic vehicle speed control apparatus of claim 3, wherein the automatic vehicle speed modeler comprises:
    a speed control modeler configured to output an estimated accelerating torque command of the subject vehicle at every unit time during the preset section by using the position information;
    a target vehicle speed estimator configured to calculate a target estimate vehicle speed at every unit time according to the estimated accelerating torque command to generate a target vehicle speed profile; and
    a target requested torque estimator configured to calculate a target estimate requested torque according to a difference between the target estimate vehicle speeds respectively corresponding to the unit times to generate the target requested torque profile.

5. The automatic vehicle speed control apparatus of claim 4, wherein the speed control modeler is activated when a distance between the subject vehicle and the preceding vehicle is greater than a preset reference distance.

6. The automatic vehicle speed control apparatus of claim 4, further comprising:
    a parameter measurer configured to transmit the vehicle information of the subject vehicle and gradient information of a road on which the subject vehicle drives to the target requested torque calculator and the target requested torque estimator.

7. The automatic vehicle speed control apparatus of claim 6, wherein the target requested torque estimator receives the gradient information from the parameter measurer and corrects the target requested torque profile at every unit time.

8. The automatic vehicle speed control apparatus of claim 1, wherein when the target requested torque is greater than 0, the controller schedules driving of the subject vehicle by using the target requested torque profile during the preset section.

9. An automatic vehicle speed control method, comprising the steps of:
    detecting position information between a subject vehicle and a preceding vehicle positioned ahead of the subject vehicle;
    generating a target requested torque with respect to a current position of the subject vehicle by using the position information;
    determining whether a distance between the subject vehicle and the preceding vehicle is greater than a preset reference distance according to the position information;
    when the distance between the subject vehicle and the preceding vehicle is greater than the reference distance, generating a target requested torque profile during a preset reference section from the current position of the subject vehicle;

determining whether the target requested torque is greater than a preset lower limit value; and when the target requested torque is greater than the preset lower limit value, scheduling driving of the subject vehicle during a reference section by using the target requested torque profile.

10. The automatic vehicle speed control method of claim 9, wherein the position information includes the distance between the subject vehicle and the preceding vehicle, and vehicle speeds of the subject vehicle and the preceding vehicle.

11. The automatic vehicle speed control method of claim 9, wherein the step of generating the target requested torque further comprises:

generating an accelerating torque command of the subject vehicle by using the position information;

calculating a target vehicle speed according to the accelerating torque command; and calculating the target requested torque according to the vehicle information of the subject vehicle, gradient information of a road on which the subject vehicle drives, and a difference between a current vehicle speed of the subject vehicle and the target vehicle speed.

12. The automatic vehicle speed control method of claim 11, wherein the step of generating the target requested torque profile further comprises:

receiving the position information and calculating an estimate accelerating torque of the subject vehicle at every unit time during a preset section;

calculating a target estimate vehicle speed at every unit time according to the estimate accelerating torque; and calculating the target estimate requested torque according to the vehicle information of the subject vehicle, the gradient information of the road, and a difference between the target estimated vehicle speeds corresponding to each of the unit time.

13. The automatic vehicle speed control method of claim 12, wherein the step of calculating the target estimate requested torque further comprises:

correcting the target estimate torque according to the gradient information at every unit time.

14. The automatic vehicle speed control method of claim 9, wherein the lower limit value is 0.

15. A non-transitory computer readable medium containing program instructions executed by a processor, the computer readable medium comprising:

program instructions that detect position information between a subject vehicle and a preceding vehicle positioned ahead of the subject vehicle;

program instructions that generate a target requested torque with respect to a current position of the subject vehicle by using the position information;

program instructions that determine whether a distance between the subject vehicle and the preceding vehicle is greater than a preset reference distance according to the position information;

program instructions that generate a target requested torque profile during a preset reference section from the current position of the subject vehicle, when the distance between the subject vehicle and the preceding vehicle is greater than the reference distance;

program instructions that determine whether the target requested torque is greater than a preset lower limit value; and program instructions that schedule driving of the subject vehicle during a reference section by using the target requested torque profile, when the target requested torque is greater than the preset lower limit value.

* * * * *